US011561782B2

(12) United States Patent
Nidugala et al.

(10) Patent No.: US 11,561,782 B2
(45) Date of Patent: Jan. 24, 2023

(54) UPGRADE RECOMMENDATIONS

(71) Applicant: HEWLETT PACKARD ENTERPRISE DEVELOPMENT LP, Houston, TX (US)

(72) Inventors: Muralikrishna Nidugala, Bangalore (IN); Ajeya H Simha, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 232 days.

(21) Appl. No.: 16/775,179

(22) Filed: Jan. 28, 2020

(65) Prior Publication Data

US 2020/0278855 A1    Sep. 3, 2020

(30) Foreign Application Priority Data

Feb. 28, 2019  (IN) .............................. 201941007993

(51) Int. Cl.
| | | |
|---|---|---|
| *G06F 9/44* | (2018.01) | |
| *G06F 9/455* | (2018.01) | |
| *G06F 9/445* | (2018.01) | |
| *G06F 8/65* | (2018.01) | |
| *G06F 17/16* | (2006.01) | |

(52) U.S. Cl.
CPC ................ *G06F 8/65* (2013.01); *G06F 17/16* (2013.01)

(58) Field of Classification Search
CPC ................................... G06F 8/61; G06F 17/16
See application file for complete search history.

(56) References Cited

U.S. PATENT DOCUMENTS

| | | | |
|---|---|---|---|
| 8,434,077 B2 | 4/2013 | Chess et al. | |
| 9,256,424 B1 | 2/2016 | Kuchibhotla et al. | |
| 9,383,992 B2 | 7/2016 | Nigul | |
| 9,575,738 B1* | 2/2017 | Chopra | G06F 8/60 |
| 11,249,748 B2* | 2/2022 | Zimmer | G06F 8/65 |
| 2003/0212716 A1 | 11/2003 | Steele et al. | |
| 2012/0198438 A1* | 8/2012 | Auer | G06F 8/61 |
| | | | 717/176 |
| 2013/0014097 A1 | 1/2013 | Draper et al. | |
| 2013/0042230 A1* | 2/2013 | Little | G06F 8/65 |
| | | | 717/173 |
| 2014/0195297 A1* | 7/2014 | Abuelsaad | G06Q 10/0635 |
| | | | 705/7.28 |
| 2015/0020061 A1* | 1/2015 | Ravi | H04L 41/0883 |
| | | | 717/172 |

(Continued)

OTHER PUBLICATIONS

Robin Burke, Evaluating the Dynamic Properties of Recommendation Algorithms, 2010, pp. 1-4. https://dl.acm.org/doi/pdf/10.1145/1864708.1864753 (Year: 2010).*

(Continued)

*Primary Examiner* — Mongbao Nguyen
(74) *Attorney, Agent, or Firm* — Mauriel Kapouytian Woods LLP (57) ABSTRACT

An example recommendation device can include a memory resource storing instructions executable by a processing resource to: determine dependencies of a hardware topology, determine properties of an upgrade to be performed on the hardware topology, compare the properties of the upgrade to the determined dependencies of the hardware topology to identify potential events, and generate a recommendation for deploying the upgrade on the hardware topology based on the comparison.

9 Claims, 3 Drawing Sheets

(56) References Cited

U.S. PATENT DOCUMENTS

| | | | |
|---|---|---|---|
| 2015/0199197 A1* | 7/2015 | Maes | G06F 8/65 |
| | | | 717/122 |
| 2016/0004528 A1 | 1/2016 | Price et al. | |
| 2016/0344772 A1* | 11/2016 | Monahan | G06F 21/577 |
| 2017/0286099 A1* | 10/2017 | Wilkinson | G06F 8/65 |
| 2018/0167277 A1* | 6/2018 | Mahimkar | H04L 41/145 |
| 2018/0375718 A1* | 12/2018 | Anand | H04L 41/082 |
| 2020/0057625 A1* | 2/2020 | Livne | G06F 8/433 |
| 2020/0310394 A1* | 10/2020 | Wouhaybi | H04L 69/40 |

OTHER PUBLICATIONS

Phillipa Gill, Understanding Network Failures in Data Centers: Measurement, Analysis, and Implications, 2011, pp. 350-361. https://dl.acm.org/doi/pdf/10.1145/2018436.2018477 (Year: 2011).*

Suleman Khan, Topology Discovery in Software Defined Networks: Threats, Taxonomy, and State-of-the-Art, 2017, pp. 303-321. https://ieeexplore.ieee.org/stamp/stamp.jsp?tp=&arnumber=7534866 (Year: 2017).*

"Patch Management", The Government of the Hong Kong Special Administrative Region, Feb. 2008, 15 pages.

Benkel et al., "Pricing Data Center Services", retrieved from <https://www.forrester.com/report/Pricing+Data+Center+Services/-/E-RES109822#>, Jan. 14, 2014, 3 pages.

Charlie Cler, "Pre-Upgrade Checklist", available online at <http://archive.ibmsystemsmag.com/aix/tipstechniques/systemsmanagement/upgrade_with_flrt/>, FLRT verifies firmware and software compatibility, Apr. 2011, 2 pages.

Christy Pettey, "Top 10 Technology Trends Impacting Infrastructure & Operations", available online at <https://web.archive.org/web/20161208180104/https://www.gartner.com/smarterwithgartner/top-10-technology-trends-impacting-infrastructure-operations/>,Dec. 7, 2016, 3 pages.

Data Center News, "Human Error to Blame for 22% of Unplanned Data Center Outages", available online at <https://cloudscene.com/news/2017/07/datacenterdowntime/>, Jul. 10, 2017, 4 pages.

Gill et al., "Understanding Network Failures in Data Centers: Measurement, Analysis, and Implications", Aug. 2011, pp. 350 361.

IBM, "AIX Live Update", AIX and Power Systems Client Technical Specialist, Oct. 5, 2015, 19 pages.

Microsoft Docs, "Software Update Management", available online at <https://docs.microsoft.com/en-us/previous-versions/system-center/configuration-manager-2003/cc181545(v=technet.10)?redirectedfrom=MSDN>, Dec. 8, 2008, 9 pages.

Paul Kirvan, "Disaster Recovery: Risk Assessment and Business Impact Analysis", available online at <https://www.computerweekly.com/feature/Disaster-recovery-Risk-assessment-and-business-impact-analysis>, May 26, 2011, 6 pages.

Roger A. Grimes, "8 ways your patch management policy is broken (and how to fix it)", IDG Communications, Inc., available online at <https://www.csoonline.com/article/3025807/why-patching-is-still-a-problem-and-how-to-fix-it.html?upd=1580882290445>, Oct. 3, 2019, 7 pages.

TADDM overview, "IBM Tivoli Application Dependency Discovery Manager, Version 7.2.2", available online at <https://www.ibm.com/support/knowledgecenter/en/SSPLFC_7.2.2/com.ibm.taddm.doc_7.2.2/AdminGuide/c_cmdb_overview.html>,Jun. 19, 2013, 4 pages.

* cited by examiner

Figure 5

UPGRADE RECOMMENDATIONS

BACKGROUND

A data center can be a location where a plurality of computing devices or computing systems are stored and operated. In some examples, a data center can utilize different types of hardware and/or instructions operating on the hardware. In other examples, the data center can utilize different computing systems that utilize different versions of hardware, instructions operating on the hardware, and/or firmware. These types of data centers can be utilized to provide computing resources to a plurality of locations through a network.

DETAILED DESCRIPTION

Computing devices can include components such as hardware, instructions to perform a plurality of functions, and/or firmware. In some examples, the components can operate together to perform particular functions. For example, a first component can rely on or utilize a second component to help perform a particular function. In this example, the first component may depend on the second component to properly perform the particular function. In this example, a dependency can exist between the first component and the second component. In some examples, a computing device or computing system that utilizes a hardware topology can utilize a plurality of dependencies to perform particular functions.

In some examples, upgrades can be performed on the computing device and/or computing system. As used herein, upgrades can, for example, include alterations to hardware, instructions executed by the hardware, and/or firmware of the computing device and/or computing system. For example, an upgrade can include altering a version of the instructions executed on the hardware from a first version to a relatively newer second version. In this example, the second version may affect a first component directly and a second component indirectly. In this example, the second version may affect the second component indirectly when the first component and the second component include a dependency that is affected by the second version.

Examples of the present disclosure provide for recommendation devices to generate recommendations for deploying upgrades to components of computing devices or computing systems. For instance, an example recommendation device can include a memory resource storing instructions executable by a processing resource to: determine dependencies of a hardware topology, determine properties of an upgrade to be performed on the hardware topology, compare the properties of the upgrade to the determined dependencies of the hardware topology to identify potential events, and generate a recommendation for deploying the upgrade on the hardware topology based on the comparison.

In this way, the recommendation device can provide recommendations for deploying upgrades for particular devices within a hardware topology based on dependencies between the particular devices and other components of the hardware topology. In some examples, the recommendation that is generated can provide a better understanding of the potential effects of deploying the upgrade by considering dependencies between the upgrade to be performed and the other components of the hardware topology. In this way, an administrator of the hardware topology can better understand positive and/or negative outcomes prior to deploying the upgrade.

Figure 1:
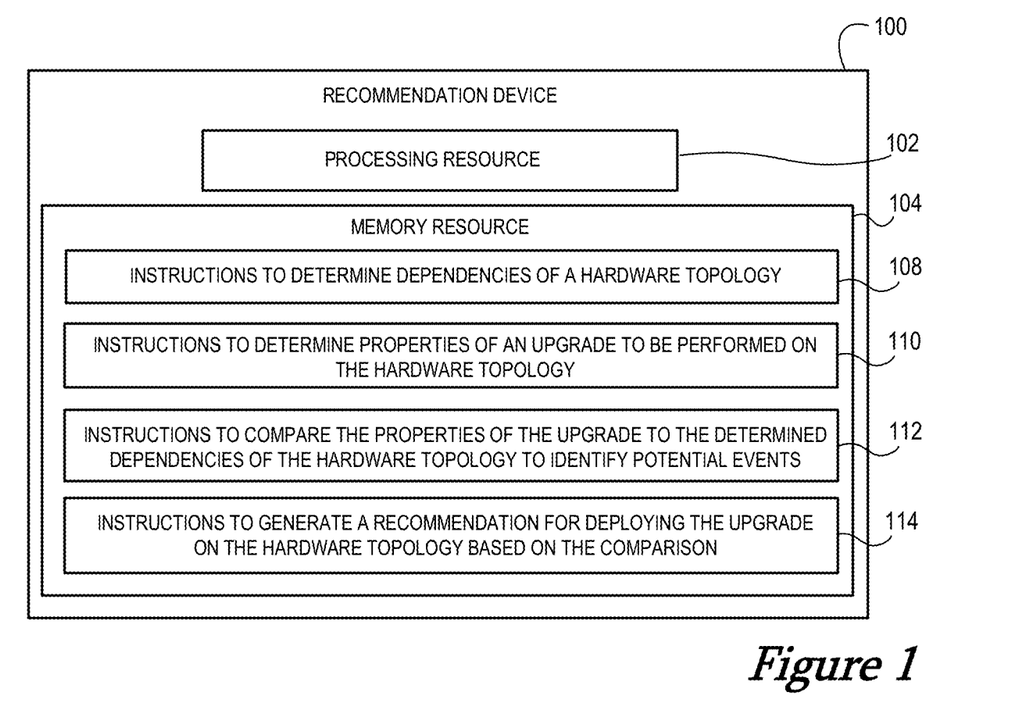
FIG. 1 is an example recommendation device for upgrade recommendations including a processing resource and a memory resource consistent with the present disclosure.

FIG. 1 is an example recommendation device 100 for upgrade recommendations including a processing resource 102 and a memory resource 104 consistent with the present disclosure. A recommendation device 100, as used herein includes a device (e.g., physical device) used for generating recommendations for upgrades to devices of a computing system (e.g., data center, server, computing device, etc.). Recommendation device 100 can be a combination of hardware and instructions for generating upgrade recommendations for a computing system. The hardware, for example, can include processing resource 102 and/or a memory resource 104 (e.g., machine readable memory (MRM), computer-readable medium (CRM), data store, etc.).

Processing resource 102, as used herein, can include a number of processing resources capable of executing instructions stored by a memory resource 104. The instructions (e.g., machine-readable instructions (MRI), software, firmware, etc.) can include instructions stored on the memory resource 104 and executable by the processing resource 102 to implement a desired function (e.g., determine dependencies between hardware and/or software of a computing system, generate recommendations for an upgrade to be performed on the computing system, etc.). The memory resource 104, as used herein, can include a number of memory components capable of storing non-transitory instructions that can be executed by processing resource 102. Memory resource 104 can be integrated in a single device or distributed across multiple devices. Further, memory resource 104 can be fully or partially integrated in the same device as processing resource 102 (e.g., within recommendation device 100) or it can be separate but accessible to that device and processing resource 102. Thus, it is noted that the recommendation device 100 can be implemented on an electronic device and/or a collection of electronic devices, among other possibilities.

The memory resource 104 can be in communication with the processing resource 102 via a communication link 106 (e.g., path). The communication link 106 can be local or remote to an electronic device associated with the processing resource 102. The memory resource 104 includes instructions 108, 110, 112, 114. The memory resource 104 can include more or fewer instructions than illustrated to perform the various functions described herein. In some examples, instructions (e.g., software, firmware, etc.) 108, 110, 112, 114 can be downloaded and stored in memory resource 104 (e.g., MRM) as well as a hard-wired program (e.g., logic), among other possibilities.

Instructions 108, when executed by a processing resource such as processing resource 102 can determine dependencies of a hardware topology. As used herein, a hardware topology can, for example, include hardware devices that utilize instructions and/or firmware to perform functions. In some examples, the hardware devices or components of a hardware topology can, at times, perform functions together. As used herein, a component of a hardware topology can, for example, include hardware devices, instructions stored or executed by the hardware devices, and/or firmware associated with the hardware devices.

In some examples, a first component of the hardware topology can include a dependency with a second component of the hardware topology. As used herein, a dependency between components such as hardware components, instruction components (e.g., software components, etc.), and/or firmware components can for example, include functional dependencies where a function being performed utilizes performance of multiple components. For example, a computing device can include components such as a hardware processor, random access memory (RAM), a memory resource, and instructions stored on the memory resource to perform a function. In this example, each of the components can include dependencies with other components. In this example, an upgrade of one of the components can affect the functionality of the other components.

In some examples, the dependencies can include dependencies between hardware components of the hardware topology. For example, a first hardware component can be connected to a second hardware component. In this example, the first hardware component may not be able to function without the support or interaction with the second hardware component. In some examples, the dependencies can include dependencies between instructions stored on hardware components of the hardware topology. For example, a first hardware component can operate or utilize instructions stored on a second hardware component. In this example, the first hardware component may not be able to function without the instructions stored on the second hardware component. In some examples, dependencies between hardware components and instructions stored on the hardware components of the hardware topology. In these examples, the hardware components may rely on the instructions stored on hardware components.

Instructions 110, when executed by a processing resource such as processing resource 102 can determine properties of an upgrade to be performed on the hardware topology. As described herein, an upgrade can be an alteration of a component of a hardware topology. For example, the upgrade can be an alteration of a hardware component, an alteration of instructions, and/or an alteration of firmware. In some examples, the properties of the upgrade can include, but are not limited to, a type of component, a component to be altered, functions of the upgrade, alterations of the upgrade, hardware devices of the hardware topology to deploy the upgrade, instructions associated with the hardware topology to deploy the upgrade, among other properties that can describe how the upgrade will be deployed within the hardware topology. In this way, the properties of the upgrade can be utilized to determine dependencies between the upgrade and other components based on the dependencies between the component to be altered and the other components of the hardware topology.

Instructions 112, when executed by a processing resource such as processing resource 102 can compare the properties of the upgrade to the determined dependencies of the hardware topology to identify potential events. As used herein, events can, for example, include alterations of performance from components of the hardware topology. For example, an event can include a component not being compatible with the upgrade. In another example, an event can include an increased performance of a component or increased security of a component. In some examples, comparing the properties of the upgrade to the determined dependencies can include comparing a converted support matrix of a first device to a converted support matrix of a second device.

In some examples, comparing the properties of the upgrade to the determined dependencies of the hardware topology can include comparing a support matrix of the upgrade or support matrix of a component associated with the upgrade to a support matrix of other components of the hardware topology. In some examples, a hardware topology can include a plurality of support matrices that can be associated with each or a portion of the plurality of components. In some examples, the support matrices of the hardware topology can be converted to a unified format such that a first support matrix can be compared to a second support matrix in the same format. For example, the first support matrix and the second support matrix can be converted to an XML or XLS file format.

In some examples, the properties of the upgrade and/or the support matrix of the upgrade can be compared to the properties or support matrices of the other components of the hardware topology to identify how the upgrade may affect the other components of the hardware topology. For example, an upgrade to a first component may alter a functionality of a second component when the first component and the second component include dependencies when performing particular functions. In this example, the comparison can identify compatibility between the upgrade of the first component and a current functionality of the second component. For example, the upgrade can be a version upgrade for the first component. In this example, the comparison can identify if the upgraded version of the first component is supported by the current version of the second component.

Instructions 114, when executed by a processing resource such as processing resource 102 can generate a recommendation for deploying the upgrade on the hardware topology based on the comparison. As used herein, a recommendation can, for example, include a notification that outlines how the upgrade is likely to perform if deployed on a component or components of the hardware topology. In some examples, the recommendation can be generated for an administrator of the hardware topology. In other examples, the recommendation can be generated to authorize a computing device to perform the upgrade.

In some examples, the generated recommendation can identify that the upgrade is likely to perform as expected from manufacturer settings. For example, an upgrade such as a security patch may receive a generated recommendation that the upgrade will provide the additional security to the component and not provide compatibility issues with other components. In a different example, the upgrade can include a new version of instructions to be executed by the hardware topology. In this example, the new version of instructions (e.g., new version of software to be deployed, etc.) may not be compatible with a current version of instructions deployed on a different component. In this example, the generated recommendation can include the incompatibility as well as incremental upgrades that can be deployed to allow the different component to be compatible with the new version of the instructions.

In this way, the generated recommendation can provide an administrator with information relating to the compatibility of an upgrade with a hardware topology prior to deploying the upgrade. In this way, the upgrade may not have to be deployed until the administrator is confident that the downtime of the hardware topology is at an acceptable point. For example, deploying an upgrade to a hardware topology that is not compatible can increase the downtime of the hardware topology, which could lead to increased cost. In this example, the generated recommendation can allow an administrator or system controller to determine when to deploy a particular upgrade and/or whether incremental upgrades are to be deployed prior to deploying the upgrade. In some examples, additional inputs from an administrator can be utilized when comparing the properties of the upgrade to the properties of the other components. In this way, components deemed to be essential or vital to a particular business can be a focus of the comparison to ensure that the deemed essential or vital components are compatible with a particular upgrade.

Figure 2:
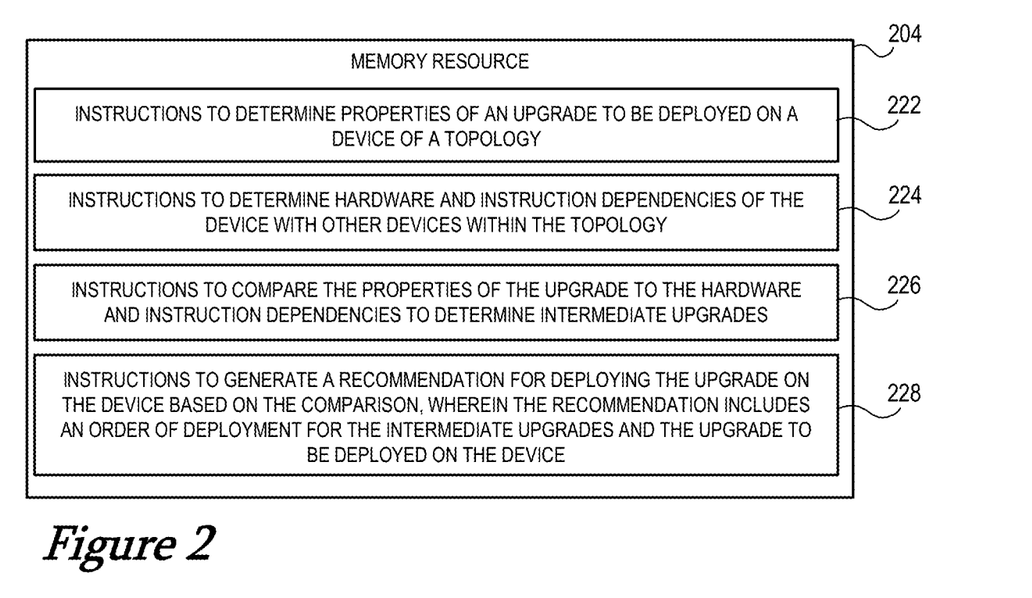
FIG. 2 is an example memory resource for upgrade recommendations including instructions executable by a processing resource consistent with the present disclosure.

FIG. 2 is an example memory resource 204 for upgrade recommendations including instructions executable by a processing resource consistent with the present disclosure. In some examples, the memory resource 204 can be part of a recommendation device (e.g., recommendation device 100, etc.) to generate recommendation for performing an upgrade on a component or devices of a computing system.

The memory resource 204 can be in communication with a processing resource via a communication link (not shown). The memory resource 204 includes instructions 222, 224, 226, 228. The memory resource 204 can include more or fewer instructions than illustrated to perform the various functions described herein. In some examples, instructions (e.g., software, firmware, etc.) 222, 224, 226, 228 can be downloaded and stored in memory resource 204 (e.g., MRM) as well as a hard-wired program (e.g., logic), among other possibilities.

Instructions 222, when executed by a processing resource can determine properties of an upgrade to be deployed on a device of a topology. As described herein, the properties of an upgrade can include a component to be altered when the upgrade is deployed or what type of functions the upgrade is to perform when deployed. In some examples, the properties of the upgrade can be utilized to determine other components of the hardware topology that may be affected or altered when the upgrade is deployed.

In some examples, the device that is to be upgraded can be determined. For example, the upgrade can be a security patch for an operating system. In this example, the upgrade can be deployed on the operating system and utilize the operating system to receive data to be utilized by the security features of the operating system. In this example, the operating system can be the component to be altered by the upgrade and may affect other components associated with the operating system and/or the security features of the operating system. In other example, the upgrade can be for a particular device within the hardware topology. For example, the firmware for a hardware device can be upgraded and the firmware upgrade can affect other components of the hardware topology that interact with the hardware device. Thus, the upgrade to the firmware of the hardware device can affect other hardware devices and/or instructions for other hardware devices of the hardware topology.

Instructions 224, when executed by a processing resource can determine hardware and instruction dependencies of the device with other devices within the topology. In some examples, the hardware and instruction dependencies of the device can include hardware dependencies between the device and other components of the topology. For example, the hardware dependencies can be other hardware components of the topology that utilize resources of the device and/or hardware components of the topology that are utilized by the device. In this way, the hardware dependencies can be utilized to compare a support matrix of the upgrade to the support matrix of the hardware that includes dependencies with the device.

In other examples, the hardware and instruction dependencies of the device can include instruction dependencies between instructions of the device and instructions of other components of the topology. For example, instructions of the other components may not be compatible with particular versions of instructions. In this example, a support matrix of the instructions of the device can be compared with support matrices of instructions utilized or stored on other components of the topology. In this way, alterations such as the upgrade to the instructions of the device can be utilized to generate a recommendation that indicates how the upgrade may affect other instructions for other components of the topology.

In some examples, the memory resource 204 can include instructions executable by a processing resource to probe devices and instructions of the topology to determine the hardware and instruction dependencies of the device. In some examples, probing the devices and instructions of the topology can include sending instructions and receiving information through responses with the devices of the topology. In this way, additional information can be retrieved from probing the devices of the topology. In some examples, the additional information from probing the devices of the topology can be stored in a database with the dependencies determined from support matrix comparisons.

Instructions 226, when executed by a processing resource can compare the properties of the upgrade to the hardware and instruction dependencies to determine intermediate upgrades. As described herein, the properties of the upgrade can be defined by a support matrix. In some examples, the support matrix of the upgrade can be converted to a uniform format with the support matrices of the hardware and instructions of the topology to identify potential events that may occur if the upgrade were to be deployed.

In some examples, the identified potential events can be utilized to identify intermediate upgrades or alterations of the topology. For example, an instructions upgrade to a device may not be compatible with instructions of a different component or device of the topology. In this example, a reason for the non-compatibility of the upgrade with the different component or device can be utilized to determine other upgrades (e.g., intermediate upgrades) that can be performed to provide compatibility with the upgrade. For example, the upgrade can be a version upgrade for a first device that may not be compatible with a version of a second device that includes dependencies with the first device. In this example, a different version of the second device may be compatible with the upgraded version of the first device. In this example, the intermediate upgrades can include the upgraded version of the second device to be deployed prior to the upgraded version of the first device such that the second device is not in a non-compatible state after the deployment of the upgraded version of the first device.

Instructions 228, when executed by a processing resource can generate a recommendation for deploying the upgrade on the device based on the comparison, wherein the recommendation includes an order of deployment for the intermediate upgrades and the upgrade to be deployed on the device. As described herein, the recommendation for deploying the upgrade on the device can include a text recommendation to an administrator that identifies potential events associated with deploying the upgrade on the device at a particular time (e.g., prior to intermediate updates, current state of the device, etc.).

In some examples, the memory resource 204 can include instructions to determine a minimum number of intermediate upgrades based on the comparison. For example, a plurality of deployment orders can be compared for intermediate upgrades of the topology to allow the upgrade to be deployed. In this example, a deployment order of intermediate upgrades can be selected based on a quantity of intermediate upgrades and/or a quantity of time to deploy the intermediate upgrades. In this way, a set of intermediate upgrades can be selected to minimize a quantity of time to deploy the intermediate upgrades and thus minimize the time to deploy the upgrade on the topology. That is, the instructions of the memory resource 204 can be executed to determine a minimum invasive number of intermediate upgrades based on a quantity of time the topology would be offline during the number of intermediate upgrades.

In some examples, the recommendation can be directed to a controller of the topology such that the controller deploys the upgrade according to the recommendation. For example, the recommendation can include instructions for the controller to deploy the upgrade on the device. In this example, the instructions can include obtaining or requesting authorization before proceeding, proceeding with a designated order of deployment based on the recommendation, among other instructions for deploying or refraining from deploying the upgrade.

Figure 3:
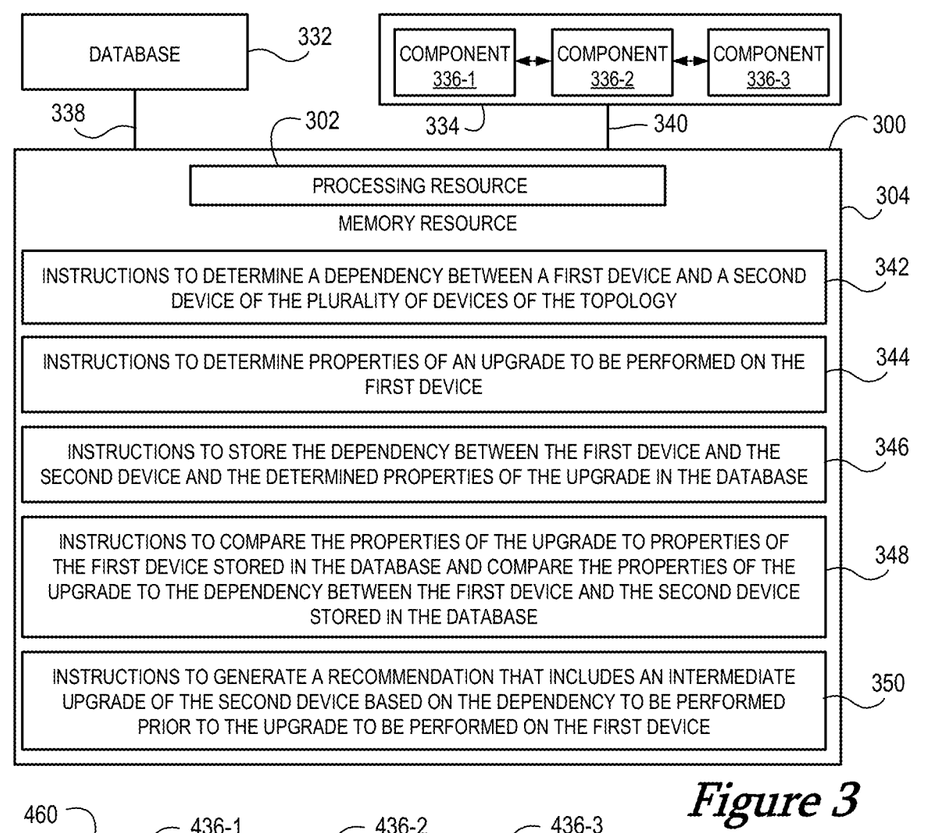
FIG. 3 is an example system for upgrade recommendations consistent with the present disclosure.

FIG. 3 is an example system 330 for upgrade recommendations consistent with the present disclosure. In some examples, the system 330 can include a topology 334. In some examples, the topology 334 can include a plurality of components 336-1, 336-2, 336-3. Even though FIG. 3 illustrates three components 336-1, 336-2, 336-3, additional or fewer components can be part of the topology 334. In some examples, the topology 334 can be a hardware topology that includes a plurality of hardware components.

In some examples, the topology 334 can include hardware components, instruction components, and/or firmware components that interact with other components of the topology 334. For example, component 336-1 can be a hardware component that includes a dependency with component 336-2 when component 336-2 is an instruction component. In this example, component 336-2 can be an instruction component that includes a dependency with component 336-3 when component 336-3 is a firmware component. In some examples, the plurality of components 336-1, 336-2, 336-3 can each be utilized to perform a particular function and thus can include dependencies. As described herein, the dependencies between the plurality of components 336-1, 336-2, 336-3 can lead to an alteration of one component affecting the other components.

In some examples, the system 330 can include a database 332. The database 332 can include memory resources for storing data. In some examples, the database 332 can be coupled be coupled to the topology 334 and/or a recommendation device 300. For example, the recommendation device 300 can be communicatively coupled to the database through path 338. As used herein, communicatively coupled can, for example, include a communication pathway that exists between components to allow communication packets or messages to be exchanged between the components. In some examples, the database 332 can be utilized to store dependencies between the plurality of components 336-1, 336-2, 336-3 of the topology 334. In some examples, the recommendation device 300 can utilize the dependencies stored within the database 332 to generate a recommendation for deploying an upgrade on the topology 334 and/or on a component of the plurality of components 336-1, 336-2, 336-3.

In some examples, the system 330 can include a recommendation device 300. In some examples, the recommendation device 300 can be communicatively coupled to the database 332 through path 338 and communicatively coupled to the topology 334 through path 340. Recommendation device 300 can be a combination of hardware and instructions for generating upgrade recommendations for a computing system. The hardware, for example, can include processing resource 302 and/or a memory resource 304 (e.g., machine readable memory (MRM), computer-readable medium (CRM), data store, etc.).

As described herein, the memory resource 304 can be in communication with the processing resource 302 via a communication link. The memory resource 304 includes instructions 342, 344, 346, 348, 350. The memory resource 304 can include more or fewer instructions than illustrated to perform the various functions described herein. In some examples, instructions (e.g., software, firmware, etc.) 342, 344, 346, 348, 350 can be downloaded and stored in memory resource 304 (e.g., MRM) as well as a hard-wired program (e.g., logic), among other possibilities.

Instructions 342, when executed by a processing resource such as processing resource 302 can determine a dependency between a first components and a second component of the plurality of components 336-1, 336-2, 336-3 of the topology 334. As described herein, the dependency between the first component can include a hardware dependency, an instruction dependency, and/or a firmware dependency, among other types of dependencies that can exist between components of a topology 334. In some examples, the dependencies can relate to functions performed by the first component that also utilize functions performed by the second component. In some examples, the first component and the second component can be components of the topology 334. As described herein, the dependencies between the first component and the second component can be based on a comparison between a first support matrix for the first component and a second support matrix of the second component. In some examples, the first support matrix and the second support matrix can be converted from a first file type to a unified file type such as XML.

Instructions 344, when executed by a processing resource such as processing resource 302 can determine properties of an upgrade to be performed on the first component. In some examples, the upgrade can be a hardware upgrade, an instructions upgrade, and/or a firmware upgrade for the topology 334 and/or a component of the topology 334. For example, the upgrade can be an instructions patch for instructions associated with component 336-1. In this examples, the properties of the upgrade to be performed on the component 336-1 can include, but is not limited to: the component 336-1 to which the upgrade is to be deployed, the type of upgrade that is to be deployed on the component 336-1, the function of the upgrade to be deployed, among other properties that can be utilized to describe or classify the upgrade. In some examples, determining the properties of the upgrade can include instructions to determine a portion of the plurality of components 336-1, 336-2, 336-3 that are affected by the upgrade. For example, which of the portion of the plurality of components 336-1, 336-2, 336-3 are altered by the upgrade and/or have dependencies with components that are altered by the upgrade.

Instructions 346, when executed by a processing resource such as processing resource 302 can store the dependency between the first component and the second component and the determined properties of the upgrade in the database. In some examples, the dependency between the first component and the second component can define a relationship between the first component and the second component. For example, the dependency can describe physical connections, communication connections, virtual connections, and/or interactions between the first component and the second component. In some examples, the dependencies between the first component and the second component can be based on interactions between the first component and the second component. For example, the interactions can include communications between the first component and the second component, functions that are shared between the first component and the second component, and/or functions that are partially performed by the first component and the second component. In this way, the dependencies can define how a change in the first component may affect the second component and vice versa.

In some examples, the dependencies between the first component and the second component can be compared to the properties of the upgrade. In some examples, the properties of the upgrade can be utilized to generate a support matrix for the upgrade in a unified format with the first support matrix of the first component and the second support matrix of the second component. In other examples, a support matrix of the upgrade can be provided by a distributer of the upgrade and the support matrix of the upgrade can be converted to the unified format to be compared with the first support matrix of the first component and the second support matrix of the second component.

Instructions 348, when executed by a processing resource such as processing resource 302 can compare the properties of the upgrade to properties of the first component stored in the database 332 and compare the properties of the upgrade to the dependency between the first component and the second component stored in the database 332. In some examples, comparing the properties of the upgrade to the properties of the first component can include comparing the first support matrix for the first component to a support matrix of the upgrade. In some examples, the comparison between the properties of the first component and the upgrade can be utilized to determine if the upgrade will cause an event when deployed on the first component in a current state. That is, the comparison can be utilized to determine if the properties of the first component are able to support the upgrade when the upgrade is deployed.

In some examples, the comparison between the first component and the upgrade can identify an intermediate upgrade to be performed on the first component prior to deploying the upgrade. For example, the upgrade can be an instruction upgrade that may utilize version two of firmware on the first component. In this example, if the current state of the first component is utilizing version one of the firmware, the comparison may identify that the first component should deploy an intermediate upgrade to alter from version one to version two of the firmware. In this example, the intermediate upgrade of the first component can allow the upgrade to be deployed without causing an event. As described herein, an event can include a malfunction or unwanted state to occur on the topology 334 and/or on a component of the topology 334.

In some examples, comparing the properties of the upgrade to the dependency between the first component and the second component stored in the database 332 can include comparing corresponding portions of the second support matrix of the second component to the support matrix of the upgrade. In some examples, the corresponding portion of the second support matrix can be portions identified based on the dependencies between the first component and the second component. For example, the dependencies can be identified based on comparing the first support matrix to the second support matrix. In this example, portions of the second support matrix can be identified that identify portions of the support matrix that are dependent on properties of the first support matrix and/or the first component. In this way, a portion of the second support matrix that is specific to the dependencies between the first component and the second component can be utilized instead of comparing the entire second support matrix of the second component to the upgrade.

In this way, properties of the second component that share dependencies with the first component are compared to the properties of the upgrade while properties of the second component that do not share dependencies with the first component are not compared to the properties of the upgrade. This can eliminate potential false events. As used herein, a false event can, for example, include an event that is identified but would not produce an actual event. For example, a false event can be an incompatibility between the upgrade and a feature of the second component when the upgrade is to be deployed on the first component. In this example, a false event could be identified if the feature of the second component does not share a dependency with the first component. That is, the upgrade may not affect or create the false event since the upgrade may not interact or affect the feature of the second component.

Instructions 350, when executed by a processing resource such as processing resource 302 can generate a recommendation that includes an intermediate upgrade of the second component based on the dependency to be performed prior to the upgrade to be performed on the first component. As described herein, the generated recommendation can be a text recommendation that can be provided to a human user or the generated recommendation can be instructions that can be provided to a processing resource of a computing device such as a controller. In some examples, the recommendation includes instructions that a portion of the intermediate upgrades are to be deployed on the other devices within the topology.

In some examples, the memory resource 304 an include instructions to determine an intermediate upgrade that is prevented from being performed on the first component based on the properties of the upgrade to be performed on the first component. In some examples, an intermediate upgrade may be prevented from being deployed due to other dependencies not associated with a current upgrade. For example, the first component may have a dependency that may be affected by the intermediate upgrade. In this example, the intermediate upgrade is prevented from being deployed on the first component.

As described herein, the recommendation can include the intermediate upgrades for deploying the upgrade to the topology 334. In some examples, the generated recommendation can include an order of deployment with regards to the intermediate upgrades. For example, the recommendation can define an order of deploying a plurality of intermediate upgrades to avoid potential events that can be caused by deploying the intermediate upgrades out of order.

In some examples, the system 330 can be utilized to identify an additional component to be added to the system 330. For example, the system 330 can be utilized to identify a third component to be added to the topology 334, determine a dependency between the third component and the first component, upgrade the database 332 with the determined dependency between the third component and the first component, and/or compare the properties of the upgrade stored in the database to the dependency between the first component and the third component stored in the database 332. In this way, the database 332 can be updated in real time and is up to date when additional components are added or when components are removed from the system 330.

Figure 4:
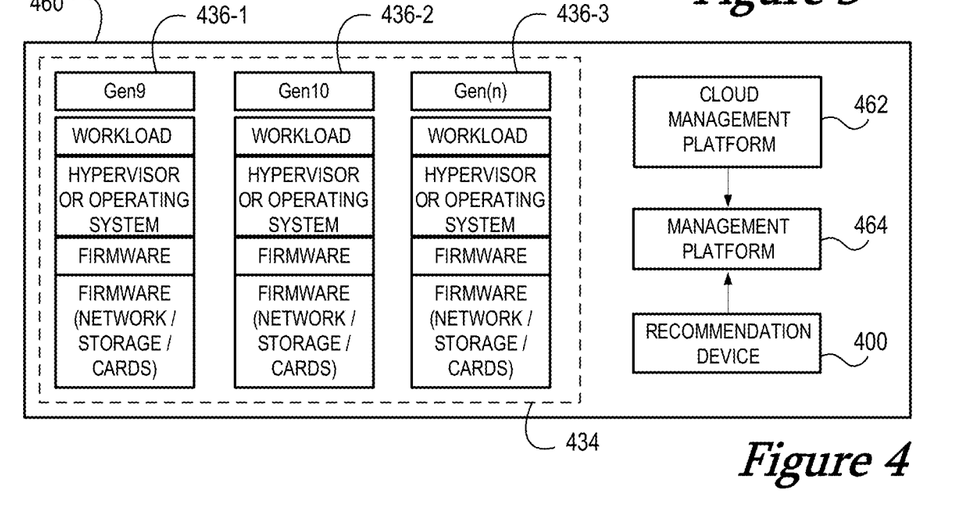
FIG. 4 is an example system for upgrade recommendations consistent with the present disclosure.

FIG. 4 is an example system 460 for upgrade recommendations consistent with the present disclosure. In some examples, the system 460 can be a datacenter that includes a topology 434 that can include components 436-1, 436-2, 436-3. In some examples, the components 436-1, 436-2, 436-3 can each include a plurality of components (e.g., hardware, workload for the hardware, operating system, hypervisor, firmware, firmware for network storage cards, etc.).

In some examples, the system 460 can include a management platform 464 that can be utilized to monitor and/or manage the topology 434. In some examples, the management platform 464 can be utilized to generate alerts when events are determined by monitoring devices of the topology 434. In some examples, the management platform 464 can receive information from a cloud management platform 462. In some examples, the cloud management platform 462 can be utilized to monitor and manage cloud resources generated by the topology 434. In some examples, the cloud management platform 462 can generate alerts in response to an event that has occurred on virtual resources generated by the topology 434. In some examples, the cloud management platform 462 can send alerts or notifications to the management platform 464 and the management platform 464 can make alterations to the topology in response to the alerts or notifications.

In some examples, the system 460 can include a recommendation device 400. The recommendation device 400 can be communicatively coupled to the management platform 464. In some examples, the recommendation device 400 can be the same or similar device as recommendation device 100 as referenced in FIG. 1, device utilizing memory resource 204 as referenced in FIG. 2, and/or recommendation device 300 as referenced in FIG. 3. That is, the recommendation device 400 can determine dependencies of the plurality of components 436-1, 436-2, 436-3 and compare the dependencies to properties of an upgrade to be deployed on the topology 434. In some examples, the recommendation device 400 can generate recommendations and provide the recommendations to the management platform 464. In some examples, the management platform 464 can send the recommendations to an administrator of the topology 434. In other examples, the management platform 464 can utilize the recommendation to deploy the upgrade and/or deploy the upgrade with other intermediate upgrades as described herein.

Figure 5:
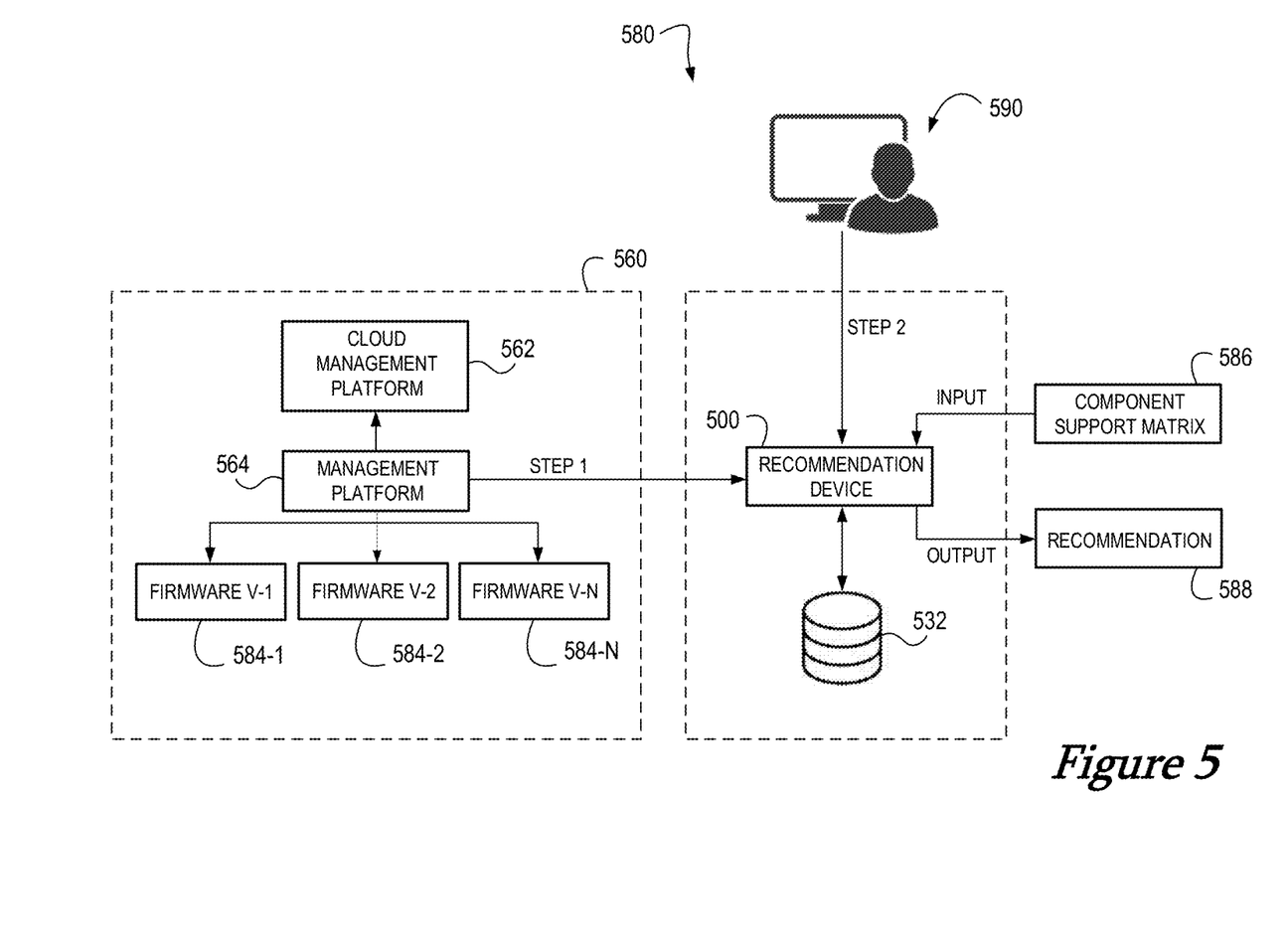
FIG. 5 is an example system for upgrade recommendations consistent with the present disclosure.

FIG. 5 is an example system 580 for upgrade recommendations consistent with the present disclosure. In some examples, the system 580 can include the same or similar features as system 460 as referenced in FIG. 4. For example, system 580 can include a recommendation device 500 coupled to a data center 560. In some examples, the data center 560 can be a system for storing and utilizing computing devices (e.g., servers, etc.). In some examples, the data center 560 can include a cloud management platform 562 and/or a management platform 564 to manage components 584-1, 584-2, 584-N of the data center 560. In some examples, the components 584-1, 584-2, 584-N can be firmware components.

In some examples, the components can represent firmware components operating on separate devices of the data center 560. For example, the component 584-1 can operate on a first device, the second component 584-2 can operate on a second device, and a third component 584-N can operate on an Nth device. In this example, the component 584-1 can be a first component that consists of a first version of the firmware, the component 584-2 can be a second component that consists of a second version of the firmware, and the component 584-N can be an Nth component that consists of an Nth version of the firmware.

As described herein, the recommendation device 500 can be utilized to generate recommendations for deploying an upgrade to a component of the data center 560. In some examples, the recommendation device 500 can determine the components 584-1, 584-2, 584-N and corresponding firmware versions of the components 584-1, 584-2, 584-N. In some examples, the discovery device 500 can utilize the discovered components 584-1, 584-2, 584-N and/or firmware versions of the components 584-1, 584-2, 584-N to identify corresponding support matrix for the components 584-1, 584-2, 584-N and convert the corresponding support matrices to a unified format such that the plurality of support matrices can be compared to identify dependencies between the components 584-1, 584-2, 584-N. In some examples, the recommendation device 500 can be communicatively coupled to a database 532. In these examples, the dependencies between the components 584-1, 584-2, 584-N can be stored in the database 532 to be utilized when a particular upgrade is selected to be deployed on the database 560.

In some examples, the recommendation device 500 can receive the component support matrices 586 for the plurality of components 584-1, 584-2, 584-N. In some examples, the system 580 can include an administrator 590. The administrator 590 can be a human user or a controller. In some examples, the administrator 590 can identify additional dependencies that are not identified by the comparison of the support matrices 586. For example, the administrator 590 may identify additional components that may be sensitive to upgrades of the components 584-1, 584-2, 584-N. In this way, the recommendation device 500 can consider the discovered dependencies as well as the additional dependencies provided by the administrator 590. As described herein, the discovered dependencies and the additional dependencies from the administrator 590 can be stored in the database 532. As described herein, the recommendation device 500 can generate recommendations 588 based on the dependencies stored in the database 532.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a number of" an element and/or feature can refer to any number of such elements and/or features.

What is claimed:

1. A recommendation device comprising a hardware processing resource in communication with a memory resource including instructions executable by the hardware processing resource to:
   determine dependencies of a hardware topology, wherein the dependencies comprise a dependency of hardware components of the hardware topology;
   determine properties of an upgrade to be performed on the hardware topology, wherein the upgrade alters a version of instructions executed on the hardware topology from a first version to a newer second version;
   compare the properties of the upgrade to the determined dependencies of the hardware topology to identify potential events;
   generate a recommendation for deploying the upgrade on the hardware topology based on the comparison, wherein the recommendation indicates how the upgrade affects other instructions for other components of the hardware topology;
   wherein the dependencies of the hardware topology include:
   dependencies between instructions stored on the hardware components of the hardware topology; and
   dependencies between the hardware components and the instructions stored on the hardware components of the hardware topology,
   wherein the instructions to determine dependencies of the hardware topology include instructions to:
   determine a support matrix for components of the hardware topology; and
   convert the support matrix to a unified file format, and
   wherein the instructions to compare the properties of the upgrade to the determined dependencies of the hardware topology include instructions to compare a converted support matrix of a first device to a converted support matrix of a second device; and
   eliminate potential false events, properties of the second device that share dependencies with the first device are compared to the properties of the upgrade while properties of the second device that do not share dependencies with the first device are not compared to the properties of the upgrade.

2. The recommendation device of claim 1, wherein the recommendation includes a plurality of intermediate upgrades to the hardware topology prior to deploying the upgrade.

3. The recommendation device of claim 1, wherein the properties of the upgrade include devices of the hardware topology to deploy the upgrade and instructions associated with the hardware topology to deploy the upgrade.

4. The recommendation device of claim 1, wherein the instructions to determine dependencies of the hardware topology include instructions to determine a version of instructions stored on the hardware components of the hardware topology.

5. A non-transitory computer-readable medium storing instructions executable by a hardware processing resource to:
   determine properties of an upgrade to be deployed on a device of a hardware topology, wherein the upgrade alters a version of instructions executed on the hardware topology from a first version to a newer second version;
   determine hardware dependencies and instruction dependencies of the device with other devices within the hardware topology;
   compare the properties of the upgrade to the hardware dependencies and instruction dependencies to determine intermediate upgrades;
   generate a recommendation for deploying the upgrade on the device based on the comparison, wherein the recommendation includes an order of deployment for the intermediate upgrades and the upgrade to be deployed on the device, wherein the recommendation indicates how the upgrade affects other instructions for other components of the hardware topology,
   wherein the recommendation includes instructions that a portion of the intermediate upgrades are to be deployed on the other devices within the hardware topology, and
   wherein the recommendation includes an order of deployment for each of the intermediate upgrades to be deployed on each of the other devices based on the hardware and instruction dependencies of the other devices,
   determine a minimum number of intermediate upgrades based on the comparison,
   wherein the instructions to determine a minimum number of intermediate upgrades includes instructions to determine a minimum invasive number of intermediate upgrades based on a quantity of time the hardware topology are being offline during the number of intermediate upgrades; and
   eliminate potential false events, properties of a second device that share dependencies with a first device are compared to the properties of the upgrade while properties of the second device that do not share dependencies with the first device are not compared to the properties of the upgrade.

6. The medium of claim 5, comprising the instructions executable to probe devices and instructions of the hardware topology to determine the hardware and instruction dependencies of the device.

7. A system comprising:
   a plurality of components of a hardware topology, wherein the plurality of components includes hardware components;
   a database stored in a memory resource communicatively coupled to the hardware topology; and
   a recommendation device communicatively coupled to the database, the recommendation device comprising a hardware processing resource in communication with the memory resource including instructions executable by the hardware processing resource to:
   determine a dependency between a first component and a second component of the plurality of components of the hardware topology;
   determine properties of an upgrade to be performed on the first component, wherein the upgrade alters a version of instructions executed on the hardware topology from a first version to a newer second version;
   store the dependency between the first component and the second component and the determined properties of the upgrade in the database;
   compare the properties of the upgrade to properties of the first component stored in the database and compare the properties of the upgrade to the dependency between the first component and the second component stored in the database;
   generate a recommendation that includes an intermediate upgrade of the second component based on the dependency to be performed prior to the upgrade to be performed on the first component, wherein the recommendation indicates how the upgrade affects other instructions for other components of the hardware topology;

convert a support matrix for the first component and a support matrix for the second component into a unified format, wherein the instructions to determine the dependency between the first component and the second component includes instructions to compare the support matrix for the first component and second component in the unified format to determine how properties of the first component affect properties of the second component, wherein the instructions to determine the properties of the upgrade include instructions to determine a portion of the plurality of components that are affected by the upgrade, and wherein the portion of the plurality of components include dependencies with hardware associated with the first component; and eliminate potential false events, properties of the second component that share dependencies with the first component are compared to the properties of the upgrade while properties of the second component that do not share dependencies with the first component are not compared to the properties of the upgrade.

8. The system of claim 7, comprising instructions to determine an intermediate upgrade that is prevented from being performed on the first component based on the properties of the upgrade to be performed on the first component.

9. The system of claim 7, comprising instructions to:

identify a third component to be added to the hardware topology;

determine a dependency between the third component and the first component;

upgrade the database with the determined dependency between the third component and the first component; and compare the properties of the upgrade stored in the database to the dependency between the first component and the third component stored in the database.

* * * * *